(12) United States Patent
Posthuma

(10) Patent No.: US 6,456,694 B1
(45) Date of Patent: Sep. 24, 2002

(54) METHOD FOR PREQUALIFYING SUBSCRIBER LINES FOR HIGH SPEED DATA SERVICE

(75) Inventor: Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/364,154

(22) Filed: Jul. 30, 1999

(51) Int. Cl.[7] .......................... H04M 1/24; H04M 3/08; H04M 3/22
(52) U.S. Cl. ............... 379/1.04; 379/22.01; 379/22.02; 379/27.03; 379/30; 370/248; 370/249
(58) Field of Search ................ 379/1, 5, 6, 22, 379/24, 26, 27, 29; 370/241.2, 248, 484, 487, 522

(56) References Cited

U.S. PATENT DOCUMENTS

| | | | | |
|---|---|---|---|---|
| 4,979,171 A | * | 12/1990 | Ashley | 370/110.2 |
| 5,420,860 A | * | 5/1995 | Stevens et al. | 370/62 |
| 5,661,776 A | * | 8/1997 | Charland | 379/2 |
| 5,805,571 A | * | 9/1998 | Zwan et al. | 370/249 |
| 5,864,602 A | * | 1/1999 | Needle | 379/6 |
| 5,991,270 A | * | 11/1999 | Zwan et al. | 370/249 |
| 6,084,946 A | * | 7/2000 | Beierle | 379/30 |
| 6,091,713 A | * | 7/2000 | Lechleider et al. | 370/248 |

* cited by examiner

Primary Examiner—Binh Tieu
(74) Attorney, Agent, or Firm—Mony Ghose; John B. MacIntyre

(57) ABSTRACT

A method and system for determining the high speed data service capability of a subscriber line includes sending an embedded test signal to a subscriber line. A reflected signal received in response to the test signal is analyzed for determining transmission characteristics of the subscriber line. Based on the reflected signal, a determination about the high speed data service capabilities of the subscriber line is made and stored for future reference.

14 Claims, 4 Drawing Sheets

METHOD FOR PREQUALIFYING SUBSCRIBER LINES FOR HIGH SPEED DATA SERVICE

TECHNICAL FIELD

This invention relates to telecommunications services and, more particularly, to determining whether a particular subscriber line can accommodate high speed data services.

BACKGROUND OF THE INVENTION

Packet data services have exploded onto the telecommunications scene as evidenced by the popularity of the Internet, facsimile machines and video-on-demand. The demand that packet data transmissions place on telecommunications systems designed for voice is substantial. Traditional subscriber lines (that is, the connection between customer premises equipment and telecommunications equipment, also known as the "local loop") are being revamped to accommodate the desire for ever increasing bandwidth for retrieving data at the fastest rate possible. Although some subscribers have abandoned traditional telecommunications services altogether (e.g., opting for cable modems to satisfy their bandwidth needs), others choose to use existing telecommunications subscriber lines for a new type of service.

More particularly, XDSL (or "X" digital subscriber line) is a digital connection to a location of a subscriber over existing, standard, single twisted pair wiring already connected to most premises. The "X" is a generic reference to indicate that there are many types of DSL service. As a result of its increased transmission capacity compared to standard telephone connections, XDSL promises to transmit large amounts of data to the premises of subscribers for computer, video and other operations in a fast and efficient manner. There are many different types of DSL services such as asymmetrical digital subscriber line (ADSL), high bit rate digital subscriber line (HDSL), high bit rate digital subscriber 2 (HDSL-2), symmetric digital subscriber line (SDSL), very high speed digital subscriber line (VDSL), ADSL-lite, and other high speed digital services.

All subscriber lines do not possess the capability of supporting high speed data services due to deficiencies in loop transmission characteristics. Therefore, service providers offering XDSL or other high speed data services to potential subscribers must first determine if the local loop can support this service. Service providers having physical access to local loops via traditional test equipment, such as mechanized loop testing (MLT) equipment, can easily perform tests to determine if a particular line is XDSL capable. MLT equipment provides computer control of the loop testing function and provides full diagnostic outputs.

As XDSL and other high speed services continue to increase in popularity, however, an ever-increasing number of service providers will offer high speed services to potential subscribers. Many of these service providers will not be able to perform metallic loop testing due to the lack of physical access to the local loop. For these service providers, the only existing option for subscriber loop testing is the dispatch of test personnel to the local loop site.

SUMMARY OF THE INVENTION

It is recognized that an unobtrusive method for testing the capability of a subscriber line for handling high speed data services is required. This need is addressed and a technological advance is achieved in the telecommunications art by using embedded test signals in call processing for determining if a particular subscriber line is high speed data (or XDSL) capable.

The test equipment generates test signals initiated upon certain call processing triggers. For example, indications of a busy signal, a "fast" busy signal, voice, announcement or audible ringing can trigger initiation of embedded test signaling in the form of "pink" noise or some other range of frequencies to the subscriber line. A response signal from the subscriber line is received and analyzed. One form of analysis is comparing the response signal with empirical or simulated data for determining whether specific properties of the subscriber line enable high speed data service capability.

Advantageously, test personnel or even the service provider who maintains the subscriber line need not accomplish testing of a subscriber line. Indeed, any node in the public switched telephone network (PSTN) with access to call processing signals can issue embedded tones to determine the capabilities of a particular subscriber line.

DETAILED DESCRIPTION

Figure 1:
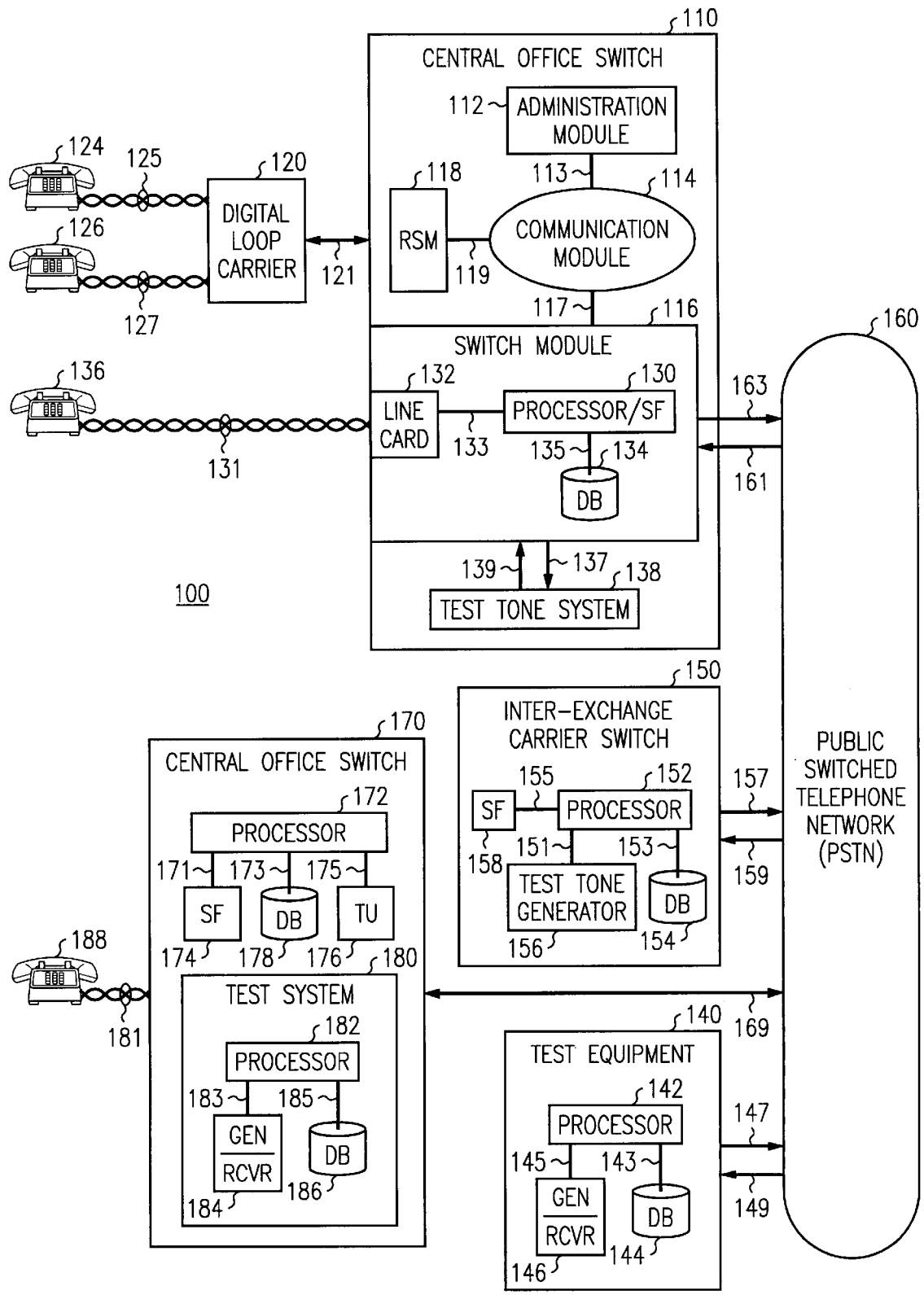
FIG. 1 is a simplified block diagram of a telecommunications system in which the method of the present invention may be practiced.

FIG. 1 is a simplified block diagram of a telecommunications system in which the method of the present invention may be practiced. More particularly, telecommunications system 100 includes central office switch 110, digital loop carrier 120, test equipment 140, interexchange carrier switch 150, public switched telephone network (PSTN) 160 and far end central office switch 170.

In this example, central office switch 110 is the Lucent Technologies Inc. 5ESS® switching system although, those skilled in the art will recognize that numerous other systems could be used. Central office switch 110 serves twisted pair, subscriber line 131 and is maintained by a first service provider. The same service provider also maintains digital loop carrier 120 which is interconnected to customer premises equipment 124, 126 via twisted pair, subscriber lines 125 and 127, respectively. Digital loop carrier 120 is interconnected to central office switch 110 via bi-directional link 121.

Central office switch 110 includes administration module 112 interconnected to communications module 114 via link 113. Communications module 114 is interconnected to switch module 116 and remote switch module (RSM) 118 via links 117 and 119, respectively. Switch module 116 includes processor and switch fabric 130 interconnected to linecard unit 132 and database 134 via links 133 and 135, respectively. Although only a single line card unit is shown, alternative embodiments include multiple line cards for serving multiple subscriber lines. Processor 130 performs functions which enable switch module 116 to provide telecommunications services to the subscriber lines which it serves. Database 134 stores subscriber related information and other data needed by switch module 116 for performing call processing functions. In this embodiment, database 134 also stores information about the XDSL capability of subscriber lines, as received from test tone system 138. Central office switch 110 is interconnected to PSTN 160 via outgoing link 161 and incoming link 163.

Test tone system 138 is interconnected to switch module 116 via outgoing link 139 and incoming link 137. Test tone system 138 generates tones (signals) which are sent to a particular subscriber line via the switch module and line card. Response signals (or reflections) of the test signals are received and analyzed in the test tone system for determining the XDSL capabilities of the subscriber line. A more detailed description of the test tone system and testing process is described below.

Test equipment 140 is similar to the test tone system shown in 138 except that it is a stand-alone system. Test equipment 140 includes processor 142 interconnected to database 144 via link 143. Tone generator and receiver 146 are interconnected to the processor via link 145. Outgoing link 147 interconnects the test equipment to the rest of the PSTN while incoming link 149 allows incoming data to be received at the test equipment.

Interexchange carrier switch 150 is similar to a central office switch but it does not serve individual subscriber lines. In this embodiment, interexchange carrier switch 150 is maintained by a second service provider which does not have direct access to subscriber lines served by central office switch 110. Interexchange carrier switch 150 is often referred to as an intermediate or tandem switch. Interexchange carrier switch 150 includes processor 152 interconnected to database 154 via link 153 and test tone system 156 interconnected to the processor via link 157. Processor 152 is interconnected to switch fabric 158 via link 159. Processor 152 and database 154 are used for administering switching functions for calls served by the second service provider. Test tone system 156 issues high speed data service test signals to subscriber lines associated with calls which are processed via interexchange carrier switch 150. In other words, the second service provider, which does not maintain any of its own subscriber lines, performs testing on those subscriber lines which it indirectly serves via test tone system 156. In this embodiment, test tone system 156 works in the same way as test tone system 138 and test equipment 140 described above. Interexchange carrier switch 150 is interconnected to PSTN 160 via outgoing link 157 and incoming link 159.

PSTN 160 represents all other components of the publicly switched telecommunications system besides those which are shown in FIG. 1. PSTN 160 is also shown interconnected, via bidirectional link 169, to far end central office switch 170. A third service provider who does not have physical access to the subscriber lines of central office switch 110 maintains central office switch 170. Central office switch 170 serves subscriber line 181 (serving telephone 188) and includes processor 172 interconnected to switch fabric 174, trunk unit 176 and database 178 via links 171, 173 and 175, respectively. Central office switch 170 also includes test tone system 180. Test tone system 180 includes processor 182, generator/receiver unit 184 and database 186; all interconnected by links 183 and 185.

Figure 2:
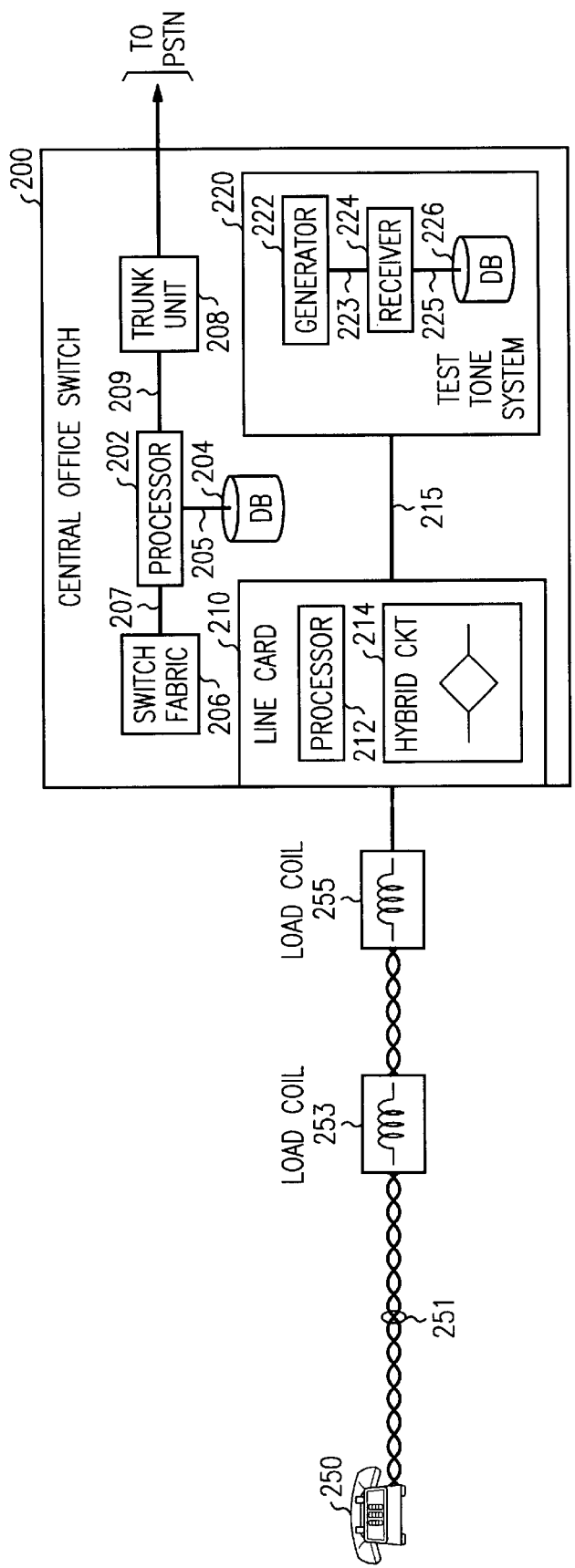
FIG. 2 is a more detailed block diagram of a subscriber line, customer premises equipment and central office switch in which the method of the present invention may be practiced.

FIG. 2 is a more detailed block diagram of a central office switch including a test tone system. Although the test tone system described below resides in a central office switch, the location of the test tone system is not critical. For example, the test tone system could be located in an interexchange carrier switch, stand-alone test equipment system or in any other node in the PSTN capable of hosting such a system, whether or not such a node is capable of originating or terminating a call. When the test tone system is located in an element which does not directly serve the subscribe line under test (that is, the subscriber line is not attached to the element), echo cancellation techniques may have to be disabled.

Central office switch 200 is interconnected to customer premises equipment 250 via subscriber line 251. In this example, subscriber line 251 includes load coils 253 and 255 for enhancing voice transmission quality. Load coils are often used on relatively long subscriber lines to compensate for the decreased voice transmission quality associated with long lines.

Central office switch 200 includes processor 202 interconnected to database 204, switch fabric 206 and trunk unit 208 via links 205, 207 and 209, respectively. Together, processor 202, database 204, switch fabric 206 and trunking unit 208 enable the central office switch to provide telecommunications services to customer premises equipment 250. Linecard 210 includes processor 212 and hybrid circuit 214. In this embodiment linecard 210 is a LPZ100 manufactured by Lucent Technologies Inc. Linecard 210 provides all BORSCHT linecard functions, as is known in the art. Processor 212 administers linecard functions and subscriber line testing as described in FIG. 4. Hybrid circuit 214 causes signal reflection, as known in the art. Hybrid circuits are described in detail in *Transmission Systems For Communications*, Members of Technical Staff, 1982 Bell Telephone Laboratories and *Subscriber Loop Signaling And Transmission Handbook*, Whitham D. Reeve, 1991, IEEE Press which are incorporated by reference herein. More particularly, hybrid circuit 214 causes reflection of test signals passed to subscriber line 251 via test tone system 220.

Figure 3:
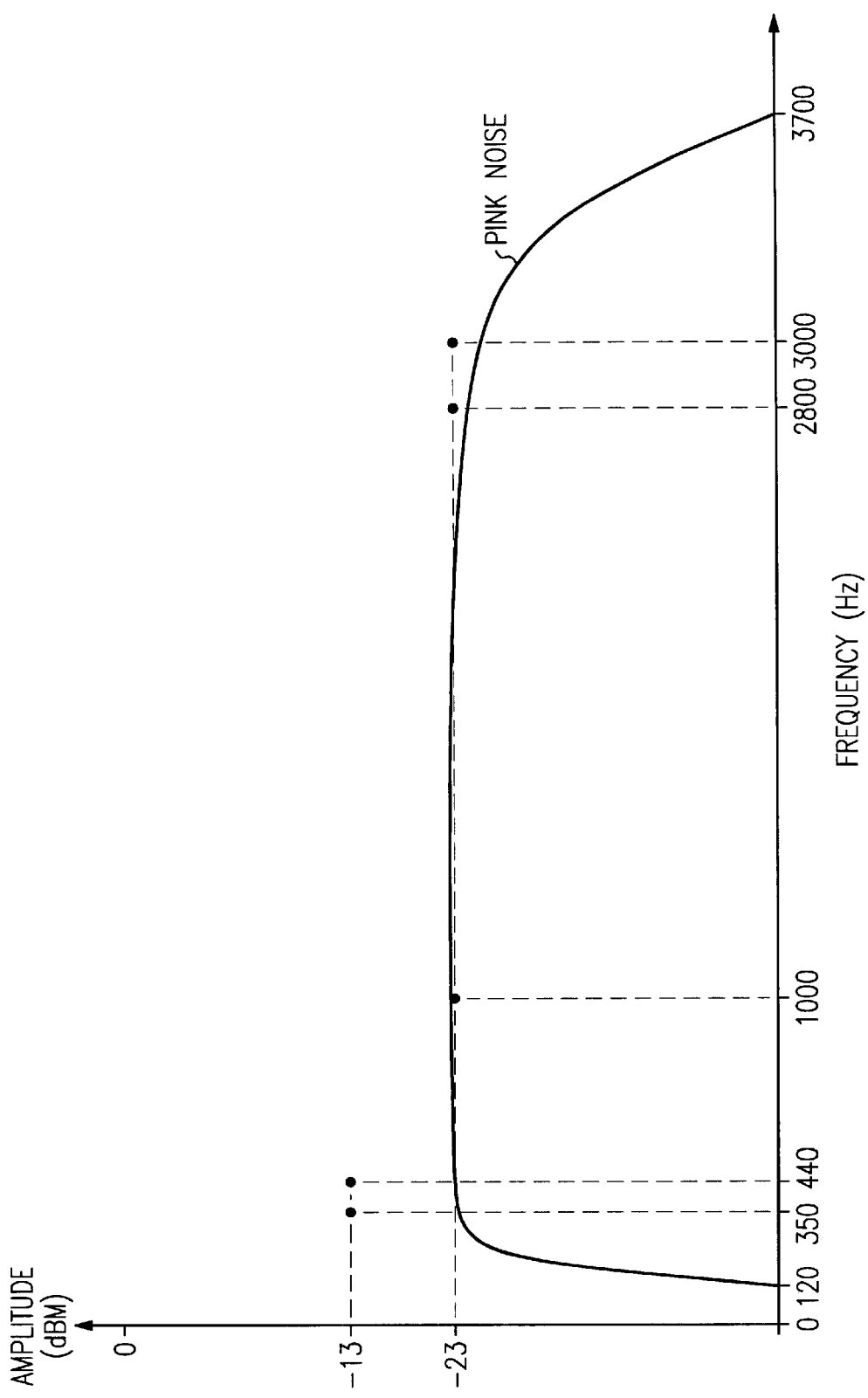
FIG. 3 is a graphical representation of embedded test signals sent to a subscriber line under test.

Test tone system 220 includes processor 221 interconnected to tone generator 222 via link 218. Tone generator 222 is interconnected to tone receiver 224 via link 223. In turn, the tone receiver is interconnected to database 226 via link 225. During testing operations, test tone system 220 generates a specific tone or signal which is transmitted over link 215 to subscriber line 251. In this example, the test signal is sent along with normal daily tone. However, the test tone signal may be sent with signals associated with a busy signal, "fast" busy signal, voice, announcements, or other signals. In some embodiments, recorded announcements may be designed or modified to produce test signals that have certain time or frequency domain characteristics. In this case, the test signal is a specific frequency signal which is designed to test the transmission capabilities of subscriber line 251 for handling high speed data services. More particularly, the generated signal may be one of voiceband "pink noise" (that is, in the approximate frequency range of 120 Hz to 3700 Hz). A graphical representation of pink noise is shown in FIG. 3. A dial tone signal at frequencies of 350 Hz and 440 Hz is sent at normal −13 dBm levels. Also shown are discrete frequency test tones such as signals at 1000 Hz, 2800 Hz and 3000 Hz which could be sent. In yet another alternate embodiment, time domain signals, such as Time Domain Reflectometer (TDR) techniques could be used. All test signals are sent at amplitude levels generally lower (e.g., by 10 to 25 dB) than the dial tone or other call processing signals so as not to be disruptive to the user of customer premises equipment 250. The dial tone and test signals are reflected by the subscriber line and sent back to test tone system 220 via bi-directional link 215. More particularly, hybrid circuit 214 causes reflection of the test signals sent by test tone system 220. Once the reflected signal is received in test system 220, the reflected signal is analyzed or compared to empirical or simulated data stored in database 226. Detailed analysis or comparison of the signal allows test system 220 to determine the types of high speed services subscriber line 251 can support.

Since high speed data services require certain transmission capabilities, the existence of load coils on subscriber line 251 may inhibit this particular line's ability to transport very high speed data services. Therefore, if the reflection signal matches data which indicates that subscriber line 251 cannot handle high speed data services, the service provider receiving the data may determine that DSL is inappropriate for subscriber line 251 unless the load coils are removed. In this manner, a quick and relatively accurate assessment of the high speed service capabilities of a subscriber line is ascertained. In another example, the existence of bridge taps (not shown) on subscriber line 251 may inhibit this particular line's ability to transport very high speed data services. Bridge taps potentially allow a subscriber line to interconnect with another subscriber. Therefore, if the reflection matches data which indicates that subscriber line 251 cannot handle the optimum level of high speed data services, the service provider receiving the data may determine that lower data rates or other lesser types of DSL are appropriate for subscriber 251.

Figure 4:
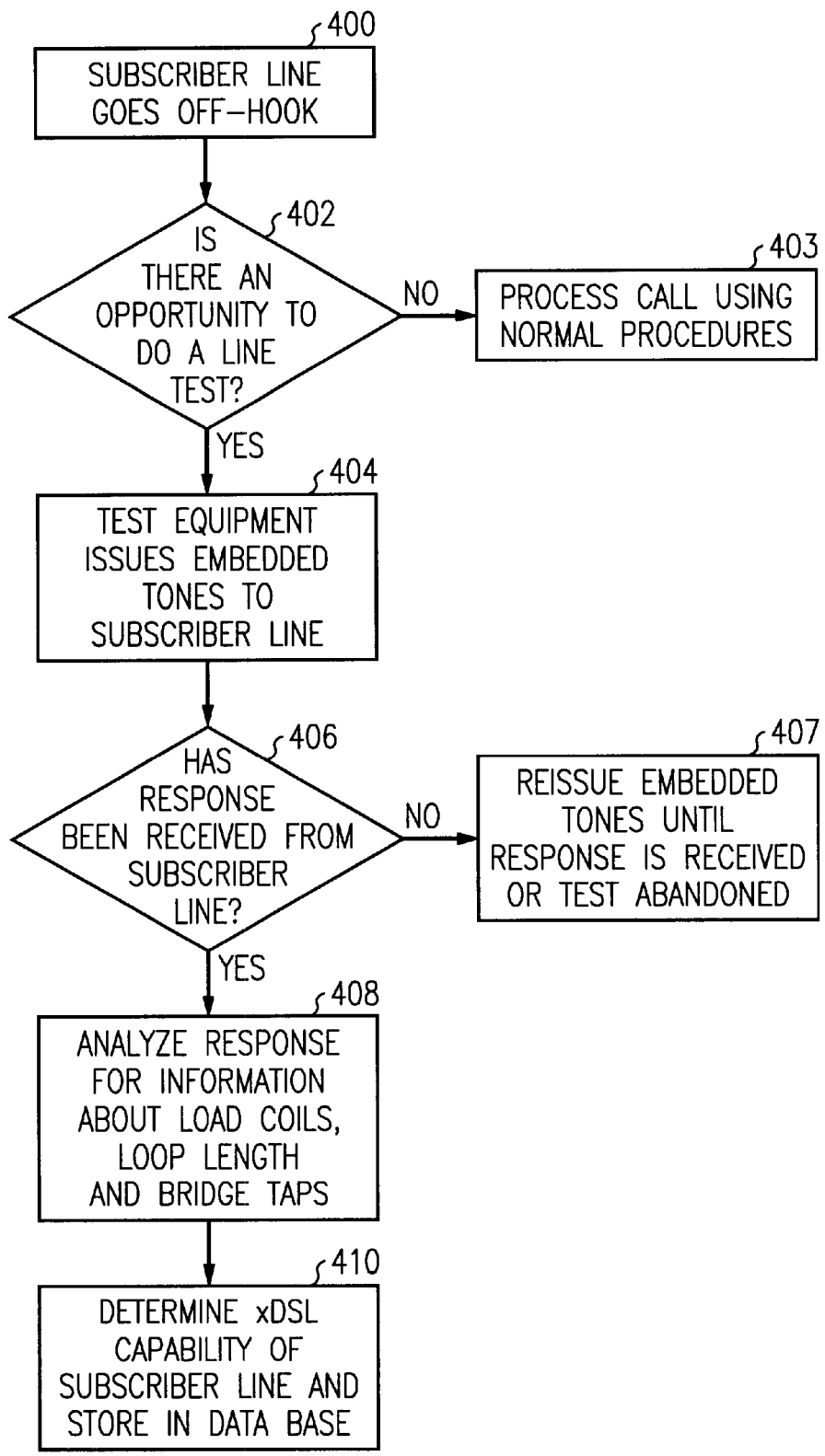
FIG. 4 is a flow diagram illustrating the steps performed in the telecommunications systems of FIGS. 1 and 2 in accordance with the method of the present invention.

FIG. 4 is a flow diagram illustrating the steps performed in the telecommunications system of FIGS. 1 and 2 for determining the high speed data service capability of a subscriber line. The process begins in step 400 in which a subscriber line goes off hook. The "off hook"status of a subscriber line indicates that the customer premises equipment served by the subscriber line is in a transmission-ready state.

In decision step 402, the test entity determines whether there is an opportunity to perform a line test. If it is the central office switch which serves the subscriber line that wishes to determine the high speed service capabilities of the line, the test is initiated at any time in which the customer premises equipment served by the line is off hook and call processing signals are being sent. In other words, during call processing signals, the central office switch may issue embedded test signals to the subscriber line. If the test entity does not have direct access to the subscriber line, only certain events and certain call processing signals enable testing of the subscriber line. For example, an interexchange carrier switch receiving call processing requests for a subscriber line may issue test signals when it sends other signals to the line. Accordingly, if the interexchange carrier provides a busy or fast busy signal to the subscriber line, it can perform tests on the line by embedding test tone signals in the tones provided to the subscriber. Similarly, since a far end central office (that is, the central office serving a called party) provides audible ringing, test signals may be sent by the far end central office at call connection.

If the outcome of decision step 402 is a "NO" determination, the process continues to step 403 in which the call is processed using normal procedures and no subscriber line test is performed. If the outcome of decision step 402 is a "YES" determination, the process continues to step 404 in which embedded tones for determining high speed data service capability are issued to the subscriber line by test equipment. The test equipment may be located within the central office switch, located within equipment maintained by an interexchange carrier, located within equipment maintained by far end carrier, or may be a stand-alone system which issues test tones to the subscriber line via the PSTN. In decision step 406, the test equipment determines whether a response has been received from the subscriber line. The response from the subscriber line is the reflection of the test signal from the line as received in the linecard and reflected by the hybrid circuit. If the outcome to decision step 406 is a "NO" determination, the testing system reissues the embedded test signal until a response is received or the test is abandoned as required in step 407.

If the outcome of decision step 406 is a "YES" determination, the process continues to step 408 in which the received response signal is analyzed for information about the subscriber line. More particularly, the response signal indicates information about load coils, loop length and bridge taps associated with the subscriber line. These characteristics directly affect the high speed service capability of the subscriber line. The test system analyzes the data or correlates it with a particular high speed data service capability (e.g., VDSL or ADSL). In step 410, the testing system determines the XDSL capability of the subscriber line based on the response and stores this capability within a database.

Advantageously, a non-obtrusive method of determining the high speed service capability of a subscriber line is devised. A subscriber line can be high speed service qualified prior to a request by users of the subscriber line for high speed services. In this manner, service providers can anticipate subscriber needs and can respond more efficiently to high speed service requests.

Although this invention has been described with respect to a preferred embodiment, those skilled in the art may devise numerous other arrangements without departing from the scope of the invention as defined in the following claims.

What is claimed is:

1. A method for determining the high speed service capability of a subscriber line comprising the steps of:
   determining that a subscriber line test opportunity is available;
   sending a test signal to the subscriber line, the test signal being embedded in call processing signals issued to the subscriber line;
   responsive to sending the test signal, receiving a response signal from a subscriber line; and
   analyzing the response signal to determine a high speed service capability of the subscriber line.

2. The method of claim 1 further comprising the step of:
   embedding the test signal in call processing signals issued to the subscriber line.

3. The method of claim 1 further comprising sending the test signal to the subscriber line from a system in a central office switch.

4. The method of claim 1 further comprising sending the test signal to the subscriber line from a stand-alone system.

5. The method of claim 4 further comprising the stand-alone system having no direct connection to the subscriber line to which the test signal is sent.

6. A central office switch serving subscriber lines comprising:
   processor for administering high speed service tests;
   test tone generator for issuing test signals embedded in call processing signals to the subscriber line; and
   test tone receiver for receiving responses from the subscriber line, wherein such responses are analyzed for determining the high speed service capability of the subscriber line.

7. The central office switch of claim 6 further comprising:
means for determining when a high speed service subscriber line test can be conducted.

8. A testing system for determining the high speed service capability of a subscriber line comprising:
- a processor for determining when a subscriber line test may be administered;
- a test tone generator for issuing a test signal embedded in call processing signals to the subscriber line;
- a test tone receiver for receiving a response signal from a subscriber line; and
- means for analyzing the response signal to determine high speed service capabilities of a subscriber line.

9. The test system of claim 8 wherein the test system is in an interexchange carrier switch.

10. The test system of claim 8 wherein the test system is in a far end central office switch.

11. The test system of claim 8 wherein the test signal is embedded in voice signals.

12. The test system of claim 8 wherein the test signal is embedded in a recorded announcement.

13. The test system of claim 8 wherein the test signal is embedded in specially intonated voice announcements.

14. The test system of claim 8 wherein the test signal is embedded in voice.

* * * * *